US010919595B2

(12) United States Patent
Murakami et al.

(10) Patent No.: US 10,919,595 B2
(45) Date of Patent: Feb. 16, 2021

(54) HYDRAULIC SHOCK ABSORBER

(71) Applicant: Showa Corporation, Gyoda (JP)

(72) Inventors: Yosuke Murakami, Fukuroi (JP);
Kazuhiro Miwa, Fukuroi (JP); Naoya
Kuroiwa, Fukuroi (JP)

(73) Assignee: Showa Corporation, Gyoda (JP)

( * ) Notice: Subject to any disclaimer, the term of this
patent is extended or adjusted under 35
U.S.C. 154(b) by 323 days.

(21) Appl. No.: 16/089,197

(22) PCT Filed: Feb. 8, 2017

(86) PCT No.: PCT/JP2017/004599
§ 371 (c)(1),
(2) Date: Sep. 27, 2018

(87) PCT Pub. No.: WO2017/169152
PCT Pub. Date: Oct. 5, 2017

(65) Prior Publication Data
US 2019/0127016 A1    May 2, 2019

(30) Foreign Application Priority Data
Mar. 30, 2016   (JP) ................ 2016-069235

(51) Int. Cl.
F16F 9/46       (2006.01)
B62K 25/08      (2006.01)
(Continued)

(52) U.S. Cl.
CPC ............. B62K 25/08 (2013.01); F16F 9/182
(2013.01); F16F 9/187 (2013.01); F16F
9/3242 (2013.01);
(Continued)

(58) Field of Classification Search
CPC ..... B62K 25/08; B62K 2201/04; F16F 9/182;
F16F 9/187; F16F 9/466; F16F 9/3242;
(Continued)

(56) References Cited

U.S. PATENT DOCUMENTS 10,093,384  B2*  10/2018  Shimasaki ............. B62K 25/08
2008/0230335 A1*   9/2008  Furuya ................... F16F 9/462
                                                    188/315
(Continued)

FOREIGN PATENT DOCUMENTS

EP      2899110 A2    7/2015
JP      60-139591 U   9/1985
(Continued)

OTHER PUBLICATIONS

International Search Report dated Apr. 11, 2017 for the corresponding PCT International Patent Application No. PCT/JP2017/004599
(Continued)

Primary Examiner — Ruth Ilan
Assistant Examiner — Marlon A Arce
(74) Attorney, Agent, or Firm — Leason Ellis LLP

(57) ABSTRACT

A hydraulic shock absorber includes a control valve. The control valve includes a valve seat formed with a closing face, a valve body configured to come into contact with the closing face, and a valve shaft configured to transmit an operation force applied from a driving unit to the valve body. The control valve is defined with an upstream side flow channel extending from an inlet coupled to the upper end opening, via a space in which the valve body moves, to the closing face, and a downstream side flow channel extending from the closing face to an outlet. The control valve is disposed above the cylinder so that a central axis of the valve shaft is inclined relative to a central axis of the vehicle body side tube and the wheel side tube.

12 Claims, 5 Drawing Sheets

(51) Int. Cl.
*F16F 9/18* (2006.01)
*F16F 9/32* (2006.01)
*F16F 9/56* (2006.01)
*F16F 9/34* (2006.01)
*F16F 9/20* (2006.01)
*F16F 9/342* (2006.01)

(52) U.S. Cl.
CPC .............. *F16F 9/46* (2013.01); *F16F 9/466* (2013.01); *F16F 9/56* (2013.01); *B60G 2300/12* (2013.01); *B62K 2201/04* (2013.01); *F16F 9/20* (2013.01); *F16F 9/3257* (2013.01); *F16F 9/34* (2013.01); *F16F 9/342* (2013.01)

(58) Field of Classification Search
CPC .... F16F 9/56; F16F 9/46; F16F 9/3257; F16F 9/34; F16F 2230/24; F16F 9/20; F16F 9/342; B60G 2300/12
See application file for complete search history.

(56) References Cited

U.S. PATENT DOCUMENTS

2012/0049427 A1* 3/2012 Hsu ..................... F16F 9/063
267/217
2012/0247893 A1* 10/2012 Gonzalez .............. F16F 9/3242
188/313
2013/0154233 A1 6/2013 Amano et al.
2014/0116828 A1* 5/2014 Noguchi ................ F16F 9/185
188/313

FOREIGN PATENT DOCUMENTS

| JP | 03-177634 A | 8/1991 |
|---|---|---|
| JP | 03-125930 U | 12/1991 |
| JP | 07-037236 B2 | 4/1995 |
| JP | 2001-074154 A | 3/2001 |
| JP | 2010-127302 A | 6/2010 |
| JP | 2012-067777 A | 4/2012 |
| JP | 2013-213531 A | 10/2013 |
| JP | 5452434 B | 1/2014 |
| JP | 2014-084988 A | 5/2014 |

OTHER PUBLICATIONS

Written Opinion dated Apr. 11, 2017 for the corresponding PCT International Patent Application No. PCT/JP2017/004599.
Extended European Search Report dated Oct. 23, 2019 for the corresponding European Patent Application No. 17773700.4.

* cited by examiner

HYDRAULIC SHOCK ABSORBER

CROSS-REFERENCE TO RELATED PATENT APPLICATIONS

This application is a U.S. National Phase Application under 35 U.S.C. § 371 of International Patent Application No. PCT/JP2017/004599, filed Feb. 8, 2017, and claims the benefit of Japanese Patent Application No. 2016-069235, filed Mar. 30, 2016, all of which are incorporated herein by reference in their entirety. The International Application was published in Japanese on Oct. 5, 2017 as International Publication No. WO/2017/169152 under PCT Article 21(2).

FIELD OF THE INVENTION

The present invention relates to hydraulic shock absorbers, and, in particular, a hydraulic shock absorber allowing a vehicle body side tube to have a shortened upper portion.

BACKGROUND OF THE INVENTION

In a saddled vehicle, such as a two-wheel vehicle and a three-wheel vehicle, a hydraulic shock absorber including a vehicle body side tube and a wheel side tube which are arranged in a telescopic manner is mainly used as a suspension device used to suspend a wheel. For example, such a hydraulic shock absorber is known that a cylinder is provided to a wheel side tube, while a rod supporting a piston slidably abutting the cylinder is provided to a vehicle body side tube (Japanese Patent No. 5452434, Japanese Unexamined Publication No. 3-177634, Japanese Unexamined Utility Model Publication No. 3-125930). In each of the hydraulic shock absorbers disclosed in Patent documents 1 to 3, a passage having an upper end opening that opens at an upper end of a rod and a lower end opening that opens inside a cylinder is defined in the rod, and a control valve configured to apply flow channel resistance to operating oil flowing from the upper end opening of the passage to a reservoir is disposed at an upper portion of the vehicle body side tube. With the hydraulic shock absorbers, the control valve can be adjusted for opening and closing in both cases in which the vehicle body side tube and the wheel side tube are compressed and extended to adjust a damping force.

Problems to be Solved by the Invention

A problem found in the techniques disclosed in Japanese Patent No. 5452434, Japanese Unexamined Publication No. 3-177634, Japanese Unexamined Utility Model Publication No. 3-125930 is, however, the control valve being disposed at the upper portion of the vehicle body side tube, extending the upper portion of the vehicle body side tube.

In view of the above described problem, the present invention has an object to provide a hydraulic shock absorber allowing a vehicle body side tube to have a shortened upper portion.

SUMMARY OF THE INVENTION

Means of Solving the Problems

To achieve the object, a hydraulic shock absorber according to the present invention includes a vehicle body side tube, a wheel side tube, a cylinder, a reservoir, a rod, a piston, a passage, and a control valve. The vehicle body side tube and the wheel side tube are respectively disposed on a vehicle body side and a wheel side in a telescopic manner. The cylinder is provided to the wheel side tube. The reservoir is defined outside the cylinder. The rod is provided to the vehicle body side tube. The piston is provided at a lower end of the rod and is slidably abutting an inner circumferential surface of the cylinder. The piston separates the cylinder into an upper chamber and a lower chamber. The passage is defined inside the rod. The passage has an upper end opening that opens at an upper end of the rod, and a lower end opening that opens inside the cylinder. The control valve is provided at an upper portion of the vehicle body side tube. The control valve is configured to apply flow channel resistance to operating oil flowing from the upper end opening of the passage to the reservoir at extension and contraction operations in which the rod exits from and enters the cylinder. The control valve includes a valve body configured to push a valve seat for opening and closing, and is disposed in an inclined manner above the cylinder.

Effects of the Invention

With the hydraulic shock absorber according to claim 1, the control valve applies the flow channel resistance to the operating oil flowing from the upper end opening of the passage to the reservoir at extension and contraction operations in which the rod exits from and enters the cylinder. The control valve provided at the upper portion of the vehicle body side tube is disposed in an inclined manner above the cylinder. Therefore, the vehicle body side tube can have a shortened upper portion, compared with a case when the control valve is not disposed in an inclined manner.

DETAILED DESCRIPTION OF THE INVENTION

Figure 1:
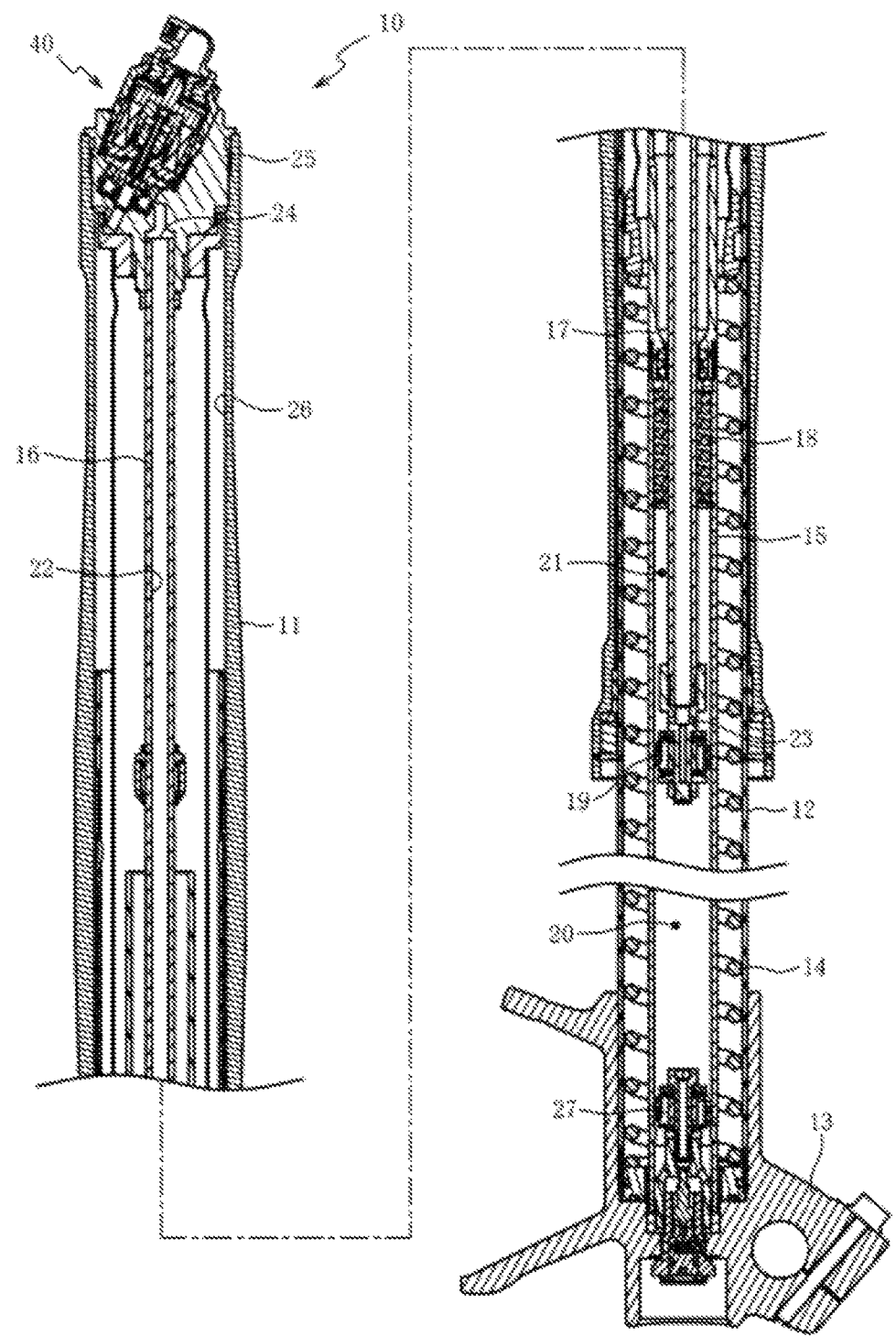
FIG. 1 is a cross-sectional view of a hydraulic shock absorber according to a first embodiment.

Advantageous embodiments of the present invention will now be described herein with reference to the accompanying drawings. A first embodiment of the present invention will now first be described herein with reference to FIG. 1. FIG. 1 is a cross-sectional view in an axial direction of a hydraulic shock absorber 10 according to the first embodiment. In FIG. 1, a center in the axial direction of a wheel side tube 12 is not illustrated. The hydraulic shock absorber 10 is a device that can be attached on both sides of a wheel (not shown) of a saddled vehicle, such as a two-wheel vehicle and a three-wheel vehicle, and in a pair of right and left, functions as a suspension device used to suspend the wheel.

As illustrated in FIG. 1, the hydraulic shock absorber 10 is a telescopic type in which the wheel side tube 12 exits from and enters a vehicle body side tube 11. The hydraulic shock absorber 10 includes the vehicle body side tube 11 that has a cylindrical shape and that is connected to a vehicle body side bracket (not shown), and the wheel side tube 12 that has a cylindrical shape and that is connected to a wheel side bracket 13. In the hydraulic shock absorber 10, between the vehicle body side tube 11 and the wheel side tube 12, a coil spring 14 biasing the vehicle body side tube 11 and the wheel side tube 12 in an extension direction is disposed. The hydraulic shock absorber 10 is to be combined, in the embodiment, with a suspension device (not shown) having a suspension spring (coil spring) and not internally having a damper to configure a front fork for a two-wheel vehicle.

When a shock is applied to the wheel (not shown) due to an uneven road surface, the hydraulic shock absorber 10 extends and contracts when the wheel side tube 12 exits from and enters the vehicle body side tube 11. The embodiment describes the hydraulic shock absorber 10 that is an inverted type in which the wheel side tube 12 exits from and enters the vehicle body side tube 11. However, it is obviously possible that the hydraulic shock absorber 10 be used for a normal side in which the vehicle body side tube 11 exits from and enters the wheel side tube 12.

The hydraulic shock absorber 10 includes a cylinder 15 attached at a lower end of the wheel side tube 12 along a central axis of the wheel side tube 12, and a rod 16 attached at an upper end of the vehicle body side tube 11 along a central axis of the vehicle body side tube 11. In the cylinder 15, an upper end opening is closed by a rod guide 17. A lower end of the rod 16 is passing through the rod guide 17. The rod guide 17 is configured to slidably support the rod 16, and is attached with a rebound spring 18 that generates a reaction force when the vehicle body side tube 11 and the wheel side tube 12 extend fully.

The cylinder 15 is filled with the operating oil. A piston 19 attached at the lower end (tip) of the rod 16 slides on an inner circumferential surface of the cylinder 15 when the vehicle body side tube 11 and the wheel side tube 12 extend and contract. The piston 19 separates the cylinder 15 into a lower chamber 20 and an upper chamber 21. In the rod 16, a passage 22 passing through in the axial direction is defined. The passage 22 has a lower end opening 23 that opens inside the cylinder 15, and an upper end opening 24 that opens at an upper end of the rod 16. In the embodiment, the lower end opening 23 opens inside the upper chamber 21.

An opening at the upper end of the vehicle body side tube 11 is closed by a cap member 25. An opening at the lower end of the wheel side tube 12 is closed by the wheel side bracket 13. In order to prevent gas and the operating oil accommodated in the vehicle body side tube 11 and the wheel side tube 12 from leaking, a cylindrical gap defined at a portion at which the vehicle body side tube 11 and the wheel side tube 12 overlap each other is sealed by an oil seal, for example. In the hydraulic shock absorber 10, a reservoir 26 is defined. The reservoir 26 is surrounded by the vehicle body side tube 11 and the wheel side tube 12, that is, lies outside the cylinder 15, stores the operating oil, and has an air chamber above a fluid level (not shown) of the stored operating oil. In the hydraulic shock absorber 10, a base valve 27 is disposed at a bottom portion of the cylinder 15, and a controller 40 is disposed on the cap member 25 at the upper end of the vehicle body side tube 11.

Figure 2:
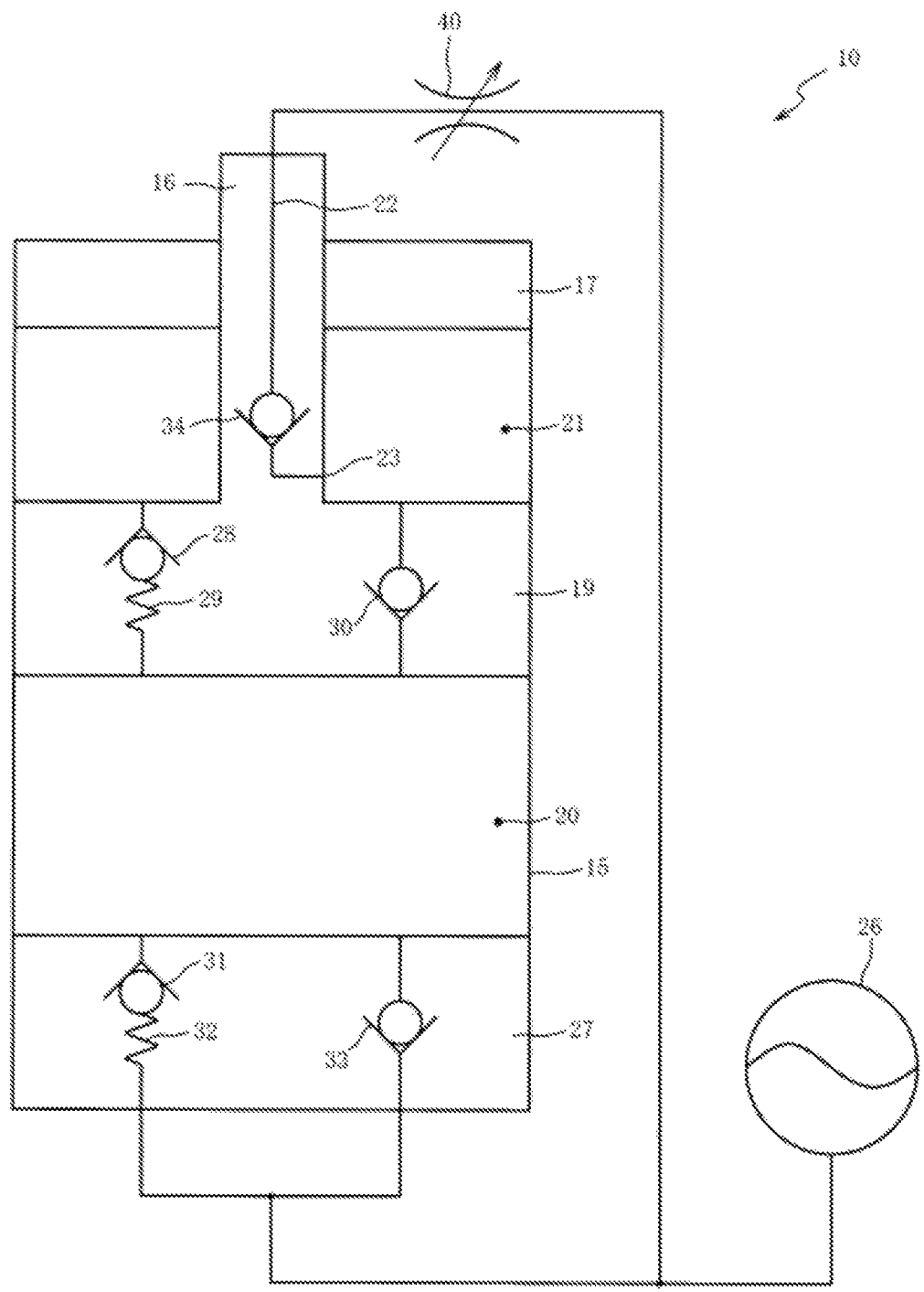
FIG. 2 is a diagram of a hydraulic circuit in the hydraulic shock absorber.

Next, a configuration and operation of a damper including the cylinder 15 and the piston 19 will now be described herein with reference to FIG. 2. FIG. 2 is a diagram of a hydraulic circuit in the hydraulic shock absorber 10. As illustrated in FIG. 2, the hydraulic shock absorber 10 includes, in the piston 19, an extension side damping valve 28 (hereinafter referred to as "damping valve 28") and a compression side check valve 30 (hereinafter referred to as "check valve 30"), as well as includes, in the base valve 27, a compression side damping valve 31 (hereinafter referred to as "damping valve 31") and an extension side check valve 33 (hereinafter referred to as "check valve 33").

The damping valve 28 is a valve configured to obtain a damping action when the operating oil flowing from the upper chamber 21 to the lower chamber 20 passes a throttle flow channel 29 during extension of the hydraulic shock absorber 10. The damping valve 31 is a valve configured to obtain a damping action when the operating oil flowing from the lower chamber 20 to the reservoir 26 passes a throttle flow channel 32 during compression of the hydraulic shock absorber 10.

The check valve 30 is a valve configured to allow, when the hydraulic shock absorber 10 is compressed, the operating oil to flow from the lower chamber 20 to the upper chamber 21. The check valve 33 is a valve configured to allow, when the hydraulic shock absorber 10 extends, the operating oil to flow from the reservoir 26 to the lower chamber 20. A flow rectifying device 34 that is disposed on the rod 16 and that has a check valve structure is a device configured to permit, when pressure in the upper chamber 21 is higher than pressure in the reservoir 26, the operating oil to flow from the upper chamber 21 to the lower end opening 23, and to prevent, when pressure in the reservoir 26 is higher than the pressure in the upper chamber 21, the operating oil from flowing from the upper chamber 21 to the lower end opening 23. The controller 40 is configured to function as a variable throttle valve.

When the hydraulic shock absorber 10 configured as described above is compressed, the rod 16 enters the cylinder 15, the piston 19 lowers in the cylinder 15, and the upper chamber 21 expands. The passage 22 is connected to the flow rectifying device 34. Therefore, the operating oil in the passage 22 cannot flow from the lower end opening 23 to the upper chamber 21. The operating oil in the contracting lower chamber 20 flows via the check valve 30 to the expanding upper chamber 21.

In the lower chamber 20, the operating oil at an amount corresponding to a volume at which the rod 16 has entered becomes excess. Therefore, the excess operating oil passes through the damping valve 31 and flows to the reservoir 26. At this time, the throttle flow channel 32 generates a damping action. However, flow channel resistance to the operating oil passing through the throttle flow channel 32 is greater than flow channel resistance to the operating oil passing through the check valve 30. Therefore, some of the excess operating oil in the lower chamber 20 flows via the check valve 30 to the upper chamber 21. In the upper chamber 21, some of the operating oil flowed from the lower chamber 20 becomes excess. Therefore, the excess operating oil passes through the flow rectifying device 34 and flows to the reservoir 26. The controller 40 (variable throttle valve) applies flow channel resistance to the operating oil flowing to the reservoir 26. Therefore, the controller 40 generates a damping action.

On the other hand, when the hydraulic shock absorber 10 extends, the rod 16 exits from the cylinder 15, the piston 19 raises in the cylinder 15, the upper chamber 21 contracts, and the lower chamber 20 expands. Some of the excess operating oil in the upper chamber 21 passes through the damping valve 28 and flows to the lower chamber 20. The rest of the excess operating oil passes through the flow rectifying device 34 and flows to the reservoir 26. At this time, the throttle flow channel 29 generates a damping action, as well as the controller 40 (variable throttle valve) generates a damping action. The operating oil in the reservoir 26 flows via the check valve 33 to the expanding lower chamber 20.

As described above, in the hydraulic shock absorber 10, the damping valve 28 and the damping valve 31 respectively generate compression and extension damping actions. In addition, the controller 40 (variable throttle valve) applies flow channel resistance to the operating oil passing through the controller 40. Therefore, extension and compression damping actions can be adjusted. The controller 40 makes the damping actions of the hydraulic shock absorber 10 to be widely variable. Therefore, ride comfort of the two-wheel vehicle (vehicle) can be improved. The controller 40 disposed at an upper portion of the vehicle body side tube 11 can make the hydraulic shock absorber 10 lighter in weight, compared with a case when controllers are disposed on both the vehicle body side tube 11 and the wheel side tube 12.

Figure 3:
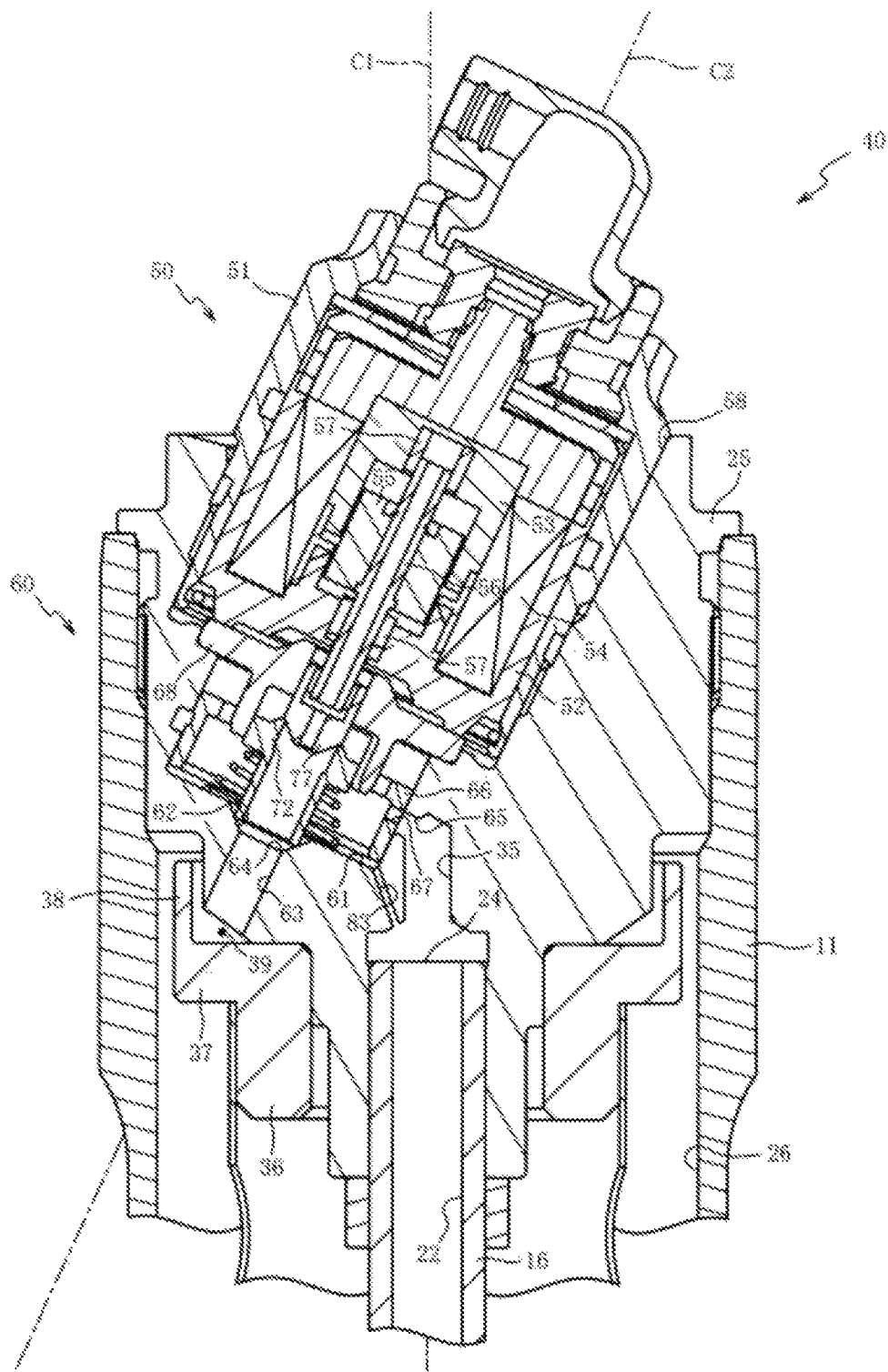
FIG. 3 is a cross-sectional view of a controller.
Figure 4:
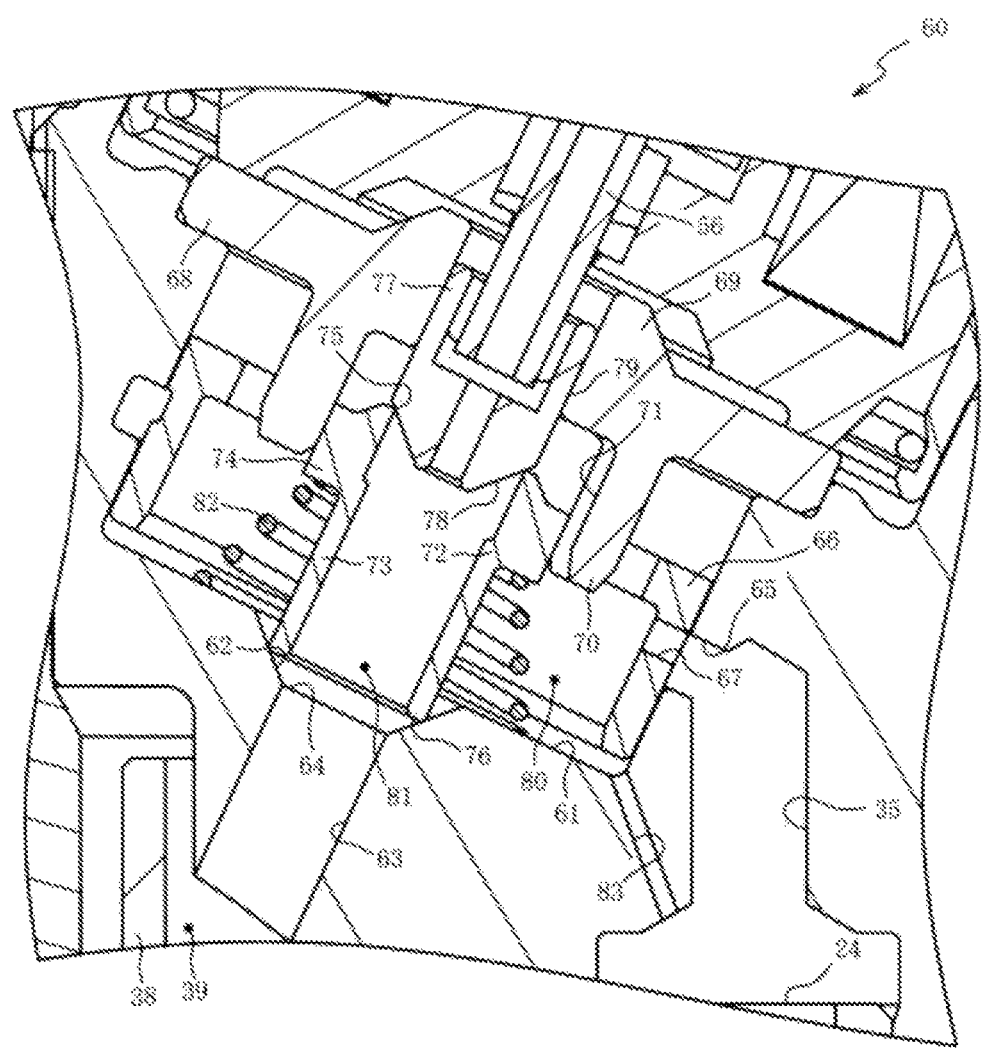
FIG. 4 is a cross-sectional view of a control valve.

Next, the controller 40 will now be described herein with reference to FIGS. 3 and 4. FIG. 3 is a cross-sectional view of the controller 40 and the upper portion of the vehicle body side tube 11. FIG. 4 is a cross-sectional view of a control valve 60. As illustrated in FIG. 3, the controller 40 is secured to the cap member 25. In the cap member 25, a first passage 35 that is in communication with the upper end opening 24 of the rod 16 is defined. The first passage 35 is a passage having a cylindrical shape and a central axis that is in line with a central axis C1 of the rod 16.

On an outer circumference of a lower portion of the cap member 25, a sleeve 36 having a cylindrical shape is secured. A flange 37 is defined at an upper end of the sleeve 36. On an outer circumference of the flange 37, a wall portion 38 having a cylindrical shape protruding along the central axis C1 is provided. The wall portion 38 is a portion defining, together with the cap member 25, an oil storage chamber 39 (described later) that is an annular space.

As illustrated in FIG. 3, the controller 40 includes a driving unit 50 and the control valve 60. The driving unit 50 includes two cores 52 and 53 each having a bottomed cylinder shape accommodated inside a case 51 having a cylindrical shape, a coil 54 disposed between the cores 52 and 53, a yoke 55 disposed inside the core 53 and the coil 54, and a valve shaft 56 supported by the yoke 55. Bushings 57 respectively movably support both ends of the valve shaft 56. The core 53 is a stationary iron core. The yoke 55 is a movable iron core. Therefore, when the coil 54 is powered and a magnetic field is generated, the yoke 55 is applied with an operation force in a central axis C2 of the valve shaft 56, i.e., in an axial direction. The case 51 is accommodated in a hole portion 58 defined in the cap member 25.

By disposing a switch (not shown) configured to operate the driving unit 50 on a handlebar of the vehicle, for example, a rider can operate the driving unit 50 to improve ride comfort of the vehicle as the rider desires. Vibrations applied to the wheel, a speed and a degree of acceleration of a vehicle body, a braking operation, and how the suspension devices extend and contract, for example, may be detected, and the driving unit 50 may operate in accordance with a result of detection.

As illustrated in FIG. 4, in the control valve 60, a recessed portion 61 having a bottomed cylindrical shape defined in the cap member 25 defines part of a valve casing. The recessed portion 61 is defined in the cap member 25 so as to away from the first passage 35, and continuously extends in an axial direction of the hole portion 58. On the recessed portion 61, a bottom face (bottom portion) is defined at a position deeper than a position of an upper end of the first passage 35. On the recessed portion 61, an abutting portion 62 is defined at a center of the bottom face. The abutting portion 62 (part of the bottom portion) is an inclined face having a conical surface shape in which its inner diameter reduces toward a center. At the center of the abutting portion 62, a second passage 63 passing through the cap member 25 to join the oil storage chamber 39 is defined. A boundary between the abutting portion 62 and the second passage 63 defines an outlet 64 of a flow channel in the control valve 60. In the cap member 25, a third passage 65 that has an annular shape and that is in communication with a side face of the recessed portion 61 and the first passage 35 is defined.

A barrel 66 is a member that has a cylindrical shape and that defines the valve casing together with the recessed portion 61, in which a value of a length in the axial direction is set smaller than a value of a depth of the recessed portion 61. Therefore, the barrel 66 can move in a depth direction of the recessed portion 61. On the barrel 66, an inlet 67 of a flow channel passing through a side portion is formed. The inlet 67 is formed at a position joining the third passage 65. The third passage 65 raises and inclines relative to the central axis C1 in a direction from the first passage 35 toward the inlet 67. In the embodiment, the barrel 66 is integral to a valve seat 72 (described later).

A central axis of the barrel 66 and the central axis C2 of the valve shaft 56 are shared. The barrel 66 is disposed in an inclined manner on the cap member 25 so that the central axis C2 and the central axis C1 of the rod 16 intersect each other at an acute angle. Therefore, compared with a case when the control valve 60 is disposed so that the central axis C2 and the central axis C1 of the rod 16 are arranged in parallel to each other, an area of the control valve 60, which occupies a cross-section in a direction orthogonal to the axis of the vehicle body side tube 11 can be reduced. As a result, a space for disposing the control valve 60 can be secured at the upper portion (cap member 25) of the vehicle body side tube 11. The barrel 66 is disposed outside in an inclined manner in the direction orthogonal to the axis of the first passage 35, reducing a length in a central axis C1 direction to an upper end of the barrel 66, compared with a case when the barrel 66 is disposed on a position in the axial direction of the first passage 35. The central axis C2 and the central axis C1 intersect each other at an acute angle. Therefore, with a shorter passage of the first passage 35 and the third passage 65, the inlet 67 of the control valve 60 and the upper end opening 24 of the rod 16 can be easily connected to each other.

A lid 68 is a member that has a disc shape, that is used to define a flow channel inside the recessed portion 61, and that is disposed at an upper portion of the recessed portion 61. On the lid 68, a valve body guide 69 passing through in a thickness direction is formed at a center. The valve body guide 69 is a portion into which the valve shaft 56 and a valve body 77 are inserted, and is configured to movably support the valve body 77 along the central axis C2. On the lid 68, a plurality of valve seat guides 70 each having a bar shape extending in the axial direction along the central axis C2 are provided around the valve body guide 69. The valve seat guides 70 are portions configured to restrict the valve seat 72 and the barrel 66 from rotating about the central axis C2, as well as to movably support the valve seat 72 along the central axis C2. On an inner surface of the valve seat guides 70, grooves 71 each extending along the central axis C2 are formed. The grooves 71 define part of a flow channel (upstream side flow channel 80, described later).

The valve seat 72 is a member having a cylindrical shape on which a closing face 75 having an annular shape is formed at an end, and is integral to the barrel 66. The valve seat 72 includes a cylinder portion 73 having a cylindrical shape disposed along the central axis C2, and a pressing force generating portion 74 protruding in a flanged shape from an outer circumference on a side, which lies adjacent to the driving unit 50, of the cylinder portion 73 outward in a radial direction. The closing face 75 is formed at a center of the pressing force generating portion 74. A central axis of the cylinder portion 73 and the central axis C2 of the valve shaft 56 are shared.

On the valve seat 72, an outer diameter (an outer diameter of the cylinder portion 73) of an end face 76 lying opposite to the closing face 75 is set smaller than an outer diameter of the abutting portion 62. Therefore, the end face 76 of the valve seat 72 closely comes into contact with the abutting portion 62. The valve seat 72 is set to a length in the axial direction so that, with the end face 76 coming into contact with the abutting portion 62, a distance (space) in the axial direction is provided between a tip in the axial direction of the closing face 75 and an inner surface of the lid 68. Similar to the valve seat 72, the barrel 66 is set to a length in the axial direction so that, with the end face 76 coming into contact with the abutting portion 62, a distance (space) in the axial direction is provided between an upper end face of the barrel 66 and the lid 68.

The pressing force generating portion 74 is set to a size (length) so as to lie inside the valve seat guides 70 with the end face 76 of the valve seat 72 coming into contact with the abutting portion 62. In the pressing force generating portion 74, an outer diameter is set slightly smaller than an inner diameter formed by the valve seat guides 70. Therefore, the valve seat 72 is movably guided in the axial direction by the valve seat guides 70.

On the pressing force generating portion 74, an area of a surface (a surface including the closing face 75) intersecting the central axis C2, on a side on which the closing face 75 lies, is greater than an area of a surface (an annular surface exposed from the cylinder portion 73) intersecting the central axis C2, on a side on which the end face 76 lies. Therefore, pressure of the operating oil flowing in the flow channel acts onto the pressing force generating portion 74, and a thrust pushing the end face 76 of the valve seat 72 in the axial direction against the abutting portion 62 is generated. As a result, the valve seat 72 being guided in the axial direction by the valve seat guides 70 is pushed against the abutting portion 62 by the pressure of the operating oil.

The valve body 77 is a member configured to control flow of the operating oil so that, when the valve is closed, a tip 78 comes into contact with a whole circumference of the closing face 75 of the valve seat 72. The valve body 77 is transmitted with an operation force (a reciprocating motion along the central axis C2) from the driving unit 50 via the valve shaft 56. A central axis of the valve body 77 and the central axis C2 of the valve shaft 56 are shared. On the valve body 77, the tip 78 having a conical shape is formed, and a side face 79 having a columnar shape slides on an inner circumferential surface of the valve body guide 69. The valve body 77 has an outer diameter set slightly larger than an outer diameter of the closing face 75.

In the control valve 60, with the end face 76 of the valve seat 72 fully coming into contact with the abutting portion 62, the valve casing defined by the recessed portion 61 and the barrel 66, for example, as well as the lid 68 and the valve seat 72, for example, define an upstream side flow channel 80 from the inlet 67 to the closing face 75, and a downstream side flow channel 81 from the closing face 75 to the outlet 64. When part of the end face 76 of the valve seat 72 moves away from the abutting portion 62, the operating oil does not pass through the closing face 75, but passes through the abutting portion 62 to flow to the outlet 64, short-circuiting the upstream side flow channel 80 and the downstream side flow channel 81. The end face 76 of the valve seat 72 applies flow channel resistance to the operating oil flowing between the end face 76 and the abutting portion 62.

In the control valve 60, a spring 82 (in the embodiment, a conical coil spring) is disposed between a bottom face of the recessed portion 61 and the pressing force generating portion 74 (the surface adjacent to the end face 76) of the valve seat 72. In the cap member 25, a throttle flow channel 83 that is in communication with the bottom face of the recessed portion 61 (upstream side flow channel 80) and the upper end opening 24 of the rod 16 is formed. With geometry decided so that, when the end face 76 of the valve seat 72 comes into contact with the abutting portion 62, an end face of the barrel 66 does not come into contact with the bottom face of the recessed portion 61, an opening, which lies adjacent to the recessed portion 61, of the throttle flow channel 83 will not be closed by the barrel 66.

With the end face 76 of the valve seat 72 coming into contact with the abutting portion 62, the spring 82 is pinched and compressed between the bottom face of the recessed portion 61 and the pressing force generating portion 74. The spring 82 being compressed accumulates elastic energy biasing the valve seat 72 in a direction toward which the end face 76 moves away from the abutting portion 62. In the embodiment, the spring 82 is set to a free length and a spring constant, for example, so that a thrust in the axial direction, which is generated when the pressure of the operating oil acts onto the pressing force generating portion 74, is greater than an elastic force due to elastic energy accumulated in the spring 82. As a result, when the valve seat 72 moves away from the valve body 77 to open the valve, the end face 76 of the valve seat 72 is also pushed against the abutting portion 62.

On the other hand, on the valve seat 72, when the thrust in the axial direction, which is generated when the pressure of the operating oil acts onto the pressing force generating portion 74, becomes smaller than the elastic force generated by the elastic energy accumulated in the spring 82, and when the operation force transmitted from the driving unit 50 via the valve shaft 56 is not transmitted to the valve body 77, the spring 82 causes the end face 76 to move away from the abutting portion 62. The barrel 66 and the valve seat 72 are integral to each other. Therefore, the barrel 66 is guided by the recessed portion 61 to move together with the valve seat 72 in the axial direction (toward the lid 68). Upon the barrel 66 moves in the axial direction (toward the lid 68) and the inlet 67 is fully closed by the cap member 25 (an inner surface of the recessed portion 61), the operating oil cannot flow to the upstream side flow channel 80 via the inlet 67. At that time, the operating oil passes through the throttle flow channel 83 and flows to the upstream side flow channel 80. When the valve seat 72 and the barrel 66 move in the axial direction (toward the lid 68), and the inlet 67 is approximately half-closed by the cap member 25 (the inner surface of the recessed portion 61), the operating oil passes through both the inlet 67 and the throttle flow channel 83 and flows to the upstream side flow channel 80.

Upon the end face 76 of the valve seat 72 moves away from the abutting portion 62, the upstream side flow channel 80 and the downstream side flow channel 81 are short-circuited. Therefore, the operating oil does not pass through the closing face 75, but passes through the abutting portion 62 and flows to the outlet 64. Therefore, if a power failure occurs, for example, and the driving unit 50 no longer provides the operation force, the spring 82 causes the upstream side flow channel 80 and the downstream side flow channel 81 to short-circuit each other (fail open) to secure flow of the operating oil from the passage 22 to the reservoir 26. As a result, even when the driving unit 50 no longer provides the operation force, the throttle flow channel 83 can securely provide a damping force.

With the operation force provided by the driving unit 50, the control valve 60 adjusts an area of a gap (flow channel) between the valve body 77 and the closing face 75 of the valve seat 72 to apply the flow channel resistance to the operating oil flowing to the reservoir 26. Therefore, the controller 40 can generate a damping action.

As to the control valve 60, even when the operation force provided by the driving unit 50 is transmitted to the valve body 77 (when the driving unit 50 provides the operation force), settings of the elastic force of the spring 82 and the area of the pressing force generating portion 74, for example, allow the valve seat 72 and the barrel 66 to move in the axial direction in accordance with the pressure of the operating oil and the operation force provided via the valve body 77. Upon the valve seat 72 and the barrel 66 move upward in the axial direction, the operating oil flows not only from the inlet 67 to the control valve 60, but also from the throttle flow channel 83 to the control valve 60. Upon the valve seat 72 moves upward in the axial direction together with the valve body 77, flow of the operating oil can be switched from the inlet 67 to the throttle flow channel 83. With not only a damping action caused by an operation of the valve body 77, but also a damping action generated in the throttle flow channel 83, the damping force can be adjusted.

Upon the spring 82 pushes the valve seat 72 upward in the axial direction, and the end face 76 of the valve seat 72 moves away from the abutting portion 62, the operating oil flows from a gap between the end face 76 and the abutting portion 62 to the outlet 64. The end face 76 of the valve seat 72 causes the operating oil flowing to the outlet 64 to generate flow channel resistance, and thus to generate a damping force. The control valve 60 can adjust the damping force in accordance with an area of a gap (flow channel) between the end face 76 of the valve seat 72 and the abutting portion 62.

In the control valve 60, the operation force of the valve body 77, which is caused by the driving unit 50, the elastic force of the spring 82, and the thrust of the pressing force generating portion 74, which is provided by the operating oil, for example, are set so as to generate flow channel resistance in accordance with the pressure of the operating oil by a balance between the pressing force of the valve body 77 against the valve seat 72 and the reaction force of the valve seat 72, which is generated by the spring 82. Therefore, a damping force of the control valve 60 can finely be adjusted.

The control valve 60 disposed in an inclined manner above the cylinder 15 allows the vehicle body side tube 11 to have the upper portion (a portion above the cap member 25, or the controller 40) that is shortened in the axial direction (central axis C1 direction), compared with a case in which the control valve 60 is not disposed in the inclined manner. As a result, a feeling of strangeness of a rider, which might be caused when the hydraulic shock absorber 10 is attached to the vehicle, can be reduced. In particular, the control valve 60, a lower portion of which is disposed outside in the direction orthogonal to the axis of the first passage 35, can further shorten a size in the axial direction (central axis C1 direction) by an amount of overlap between the control valve 60 and the first passage 35, compared with a case when the control valve 60 is disposed upward in the axial direction of the first passage 35.

As to the control valve 60, the side face 79 of the valve body 77 when the valve is closed is exposed to the upstream side flow channel 80, while the tip 78 of the valve body 77 when the valve is closed is exposed to the downstream side flow channel 81. The downstream side flow channel 81 is a flow channel sharing the central axis C2, and the valve body 77 reciprocates on the central axis C2. In the control valve 60, the inlet 67 is formed at an outside position in a direction orthogonal to the axis of the valve body 77 and the valve seat 72. Therefore, a direction of flow of the operating oil to the inlet 67 (a direction orthogonal to the central axis C2) and an advancing direction (a direction toward the driving unit 50 along the central axis C2) of the valve body 77 when the valve body 77 moves away from the closing face 75, i.e., the valve is open, differ from each other.

A direction (perpendicular to the central axis C2 or perpendicular to the tip 78 having a conical shape of the valve body 77) of a force (pressure) acting onto the valve body 77 by the operating oil flowing to the upstream side flow channel 80 and the advancing direction of the valve body 77 when the valve body 77 moves away from the closing face 75, i.e., the valve is open (the direction toward the driving unit 50 along the central axis C2), differ from each other. The direction of flow of the operating oil passing through the closing face 75, and flowing from the upstream side flow channel 80 to the downstream side flow channel 81 is identical to the advancing direction of the valve body 77 when the valve is closed (a direction moving away from the driving unit 50 along the central axis C2). The operating oil in the upstream side flow channel 80 is difficult to proceed to the driving unit 50. Therefore, air bubbles contained in the operating oil flowing in the upstream side flow channel 80 are also difficult to accumulate in the driving unit 50. Air bubbles accumulated in the driving unit 50 (in particular, around an upper end of the valve shaft 56) could lower responsiveness of the valve body 77 (i.e., responsiveness in adjustment in the flow channel between the valve body 77 and the closing face 75 of the valve seat 72). However, with the embodiment, air bubbles are difficult to accumulate, in other words, lowering of the responsiveness is prevented as much as possible.

On the other hand, conventionally, a valve body was disposed so as to face the upper end opening 24 of the passage 22 in the rod 16 to apply flow channel resistance to operating oil flowing and blowing upward from the upper end opening 24 (Japanese Patent No. 5452434, Japanese Unexamined Utility Model Publication No. 3-125930, described above). Otherwise, a push rod was disposed so as to face the upper end opening 24 of the passage 22 in the rod 16 to allow the push rod to transmit the pressure of operating oil to a valve body. In other words, the pressure of the operating oil was utilized to open the valve body (Japanese Unexamined Publication No. 3-177634, described above).

In all the conventional techniques, a central axis of the rod and a central axis of the driving unit lie on a single straight line, while the direction of a force acting onto the valve body, which is provided by operating oil flowing in the upstream side flow channel, and the advancing direction of the valve body when the valve body moves away from the closing face, i.e., the valve is open, are identical to each other. The operating oil flows, in the upstream side flow channel, toward the valve body in the axial direction of the valve body. In the conventional techniques, air bubbles contained in the operating oil flowing from the upper end opening 24 are problematic, because the air bubbles could easily accumulate in the driving unit disposed on the central axis C1 of the rod 16. In addition, an operation force required to be applied to the valve body against pressure of the operating oil flowing and blowing upward from the upper end opening 24 in order to make an adjustment in the flow channel between the valve body 77 and the valve seat 72 is problematic, because power required for the driving unit becomes large.

In the embodiment, the driving unit 50 is disposed so that the central axis C1 of the rod 16 and the central axis C2 of the driving unit 50 do not lie on an identical straight line, as well as a direction of a force acting on the valve body 77 by the operating oil flowing through the upstream side flow channel 80 is set to be different from a direction toward which the valve body 77 moves. Therefore, the above described problems of the related art can be fully solved, air bubbles would be less likely to be accumulated in the driving unit 50, and the driving unit 50 having a smaller output can be adopted.

Further, with the hydraulic shock absorber 10, the operating oil is stored in the oil storage chamber 39 defined between the outlet 64 of the control valve 60 and the reservoir 26. The oil storage chamber 39 can store the operating oil at an amount corresponding to a height of the wall portion 38. The operating oil stored in the oil storage chamber 39 can prevent fluid (in particular, gas) from flowing backward from the reservoir 26 to the control valve 60, preventing, as much as possible, air bubbles from entering to the control valve 60.

Figure 5:
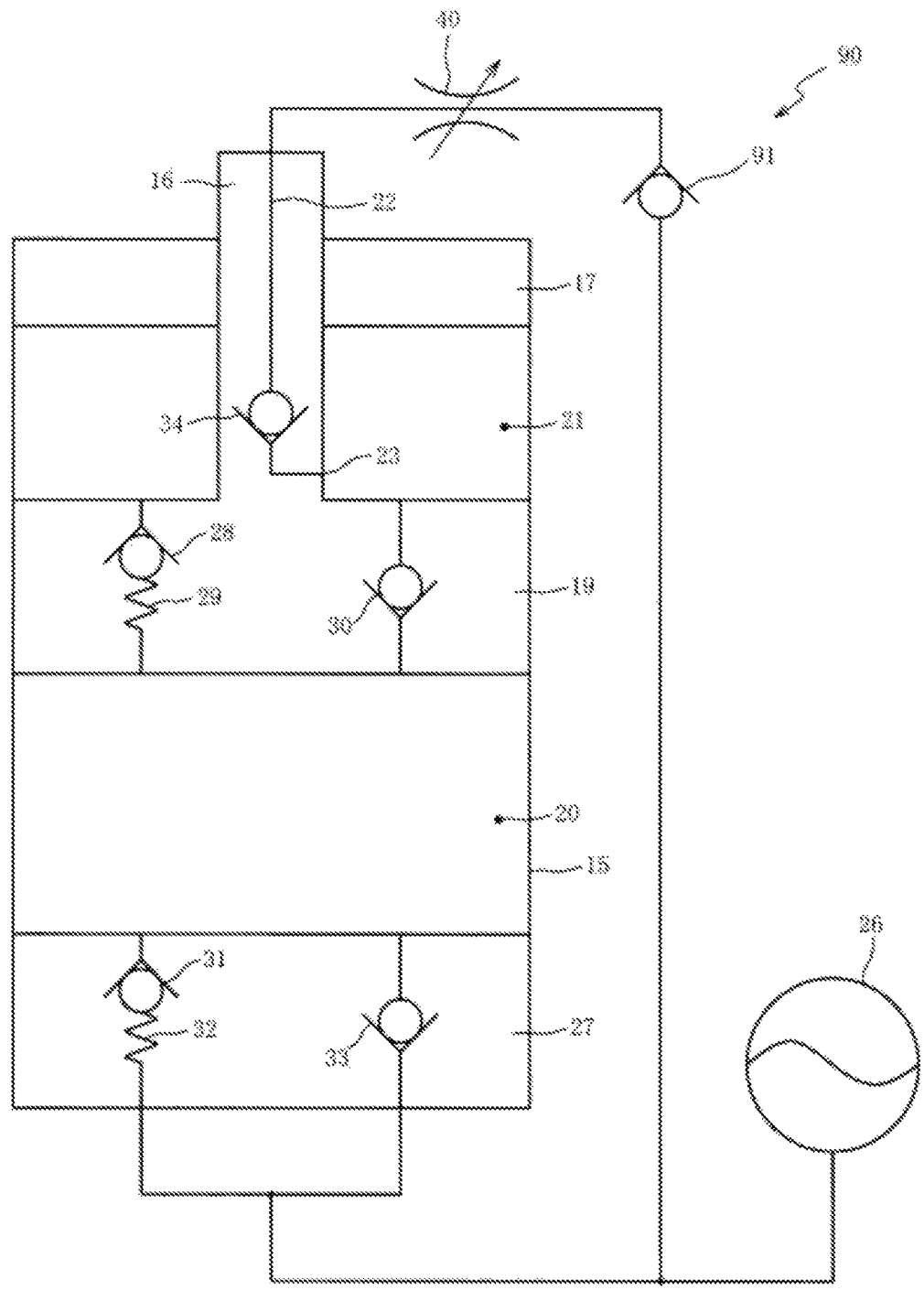
FIG. 5 is a diagram of a hydraulic circuit in a hydraulic shock absorber according to a second embodiment.

Next, a second embodiment will now be described herein with reference to FIG. 5. The first embodiment has described a case in which the oil storage chamber 39 is disposed between the controller 40 and the reservoir 26. On the other hand, the second embodiment describes a case in which a flow rectifying unit 91 configured to prevent fluid from flowing backward from the reservoir 26 to the controller 40 is disposed between the controller 40 and the reservoir 26. It is to be noted that like reference numerals used in the first embodiment designate identical or corresponding components throughout the drawings to omit duplicated descriptions. FIG. 5 is a diagram of a hydraulic circuit in a hydraulic shock absorber 90 according to the second embodiment.

As illustrated in FIG. 5, in hydraulic shock absorber 90, the flow rectifying unit 91 is disposed between the controller 40 (an outlet 64 of a control valve 60) and the reservoir 26. The flow rectifying unit 91 is a device having a check valve structure, and is configured to permit the operating oil to flow from the control valve 60 to the reservoir 26, and, on the other hand, to prevent fluid from flowing from the reservoir 26 to the control valve 60. The flow rectifying unit 91 can prevent, as much as possible, the fluid (in particular, gas) from flowing backward from the reservoir 26 to the control valve 60, preventing, as much as possible, air bubbles from entering to the control valve 60.

The present invention has been described based on the embodiments. However, it can be easily assumed that the present invention is not limited to the above described embodiments in any way, and can be variously improved and modified within a range that does not depart from the scope of the present invention. For example, shapes and sizes of the valve seat 72, the valve body 77, the upstream side flow channel 80, and the downstream side flow channel 81 can be set appropriately.

The above embodiments have described the cases in which the throttle flow channels 29 and 32 are respectively provided in both the piston 19 and the base valve 27. However, the cases represent merely examples, and it is obviously possible that either or both of the throttle flow channels 29 and 32 be omitted, and the damping valve 28 and the damping valve 31 respectively be an extension side check valve and a compression side check valve. Even when the throttle flow channels 29 and 32 are omitted, extension and compression damping actions can be adjusted with the controller 40.

The above embodiments have described the cases in which the damping valve 28 and the damping valve 31 are respectively provided in the piston 19 and the base valve 27, and the flow rectifying device 34 is provided in the rod 16. However, it is obviously possible that the damping valve 28, the damping valve 31, and the flow rectifying device 34 are omitted. In this case, the operating oil that flows as the hydraulic shock absorbers 10 and 90 extend and contract passes from the passage 22 to the controller 40. By omitting the damping valve 28, the damping valve 31, and the flow rectifying device 34, costs of the damping valve 28, the damping valve 31, and the flow rectifying device 34 can be saved, and the extension and compression damping actions can still be adjusted by the controller 40.

The above embodiments have described the cases in which the lower end opening 23 of the passage 22 formed in the rod 16 opens in the upper chamber 21. However, the cases represent merely examples, and it is obviously possible that the passage 22 is extended to the lower chamber 20, and the lower end opening 23 opens in the lower chamber 20. In this case, effects similar to the effects of the above described embodiments can also be achieved.

The above embodiments have described the cases in which the central axis C1 of the rod 16 and the central axis C2 of the valve body 77 intersect each other at an acute angle. However, the cases represent merely examples, and it is obviously possible that the central axis C2 of the valve body 77 be relocated so that the central axis C1 and the central axis C2 twist each other. In this case, effects similar to the effects of the above described embodiments can also be achieved. In addition to the example positions in which the central axis C1 and the central axis C2 respectively intersect each other at an acute angle and twist each other, it is obviously possible that the driving unit 50 and the control valve 60 be disposed so that the central axis C1 and the central axis C2 are arranged in parallel to each other. By making a direction of a force acting onto the valve body 77, which is provided by the operating oil flowing in the upstream side flow channel 80, different from the advancing direction of the valve body 77 when the valve body 77 moves away from the closing face 75, i.e., the valve is open, even when the central axis C1 and the central axis C2 are arranged in parallel to each other, effects similar to the effects of the above described embodiments can be achieved.

The above embodiments have described the cases in which the inlet 67 of the control valve 60 is provided on the side portion of the barrel 66. However, the cases represent merely examples, and it is obviously possible that the inlet 67 of the barrel 66 and the third passage 65 are omitted, and the first passage 35 is connected to the bottom face of the recessed portion 61. In this case, an opening of the first passage 35, which is formed on the bottom face of the recessed portion 61, represents an inlet of the flow channel in the control valve 60.

The above embodiments have described the cases in which, in the driving unit 50, the coil 54 is powered, the core 53 (stationary iron core) and the yoke 55 (movable iron core) interact, and the valve body 77 reciprocates on the central axis C2. However, the cases represent merely examples, and it is obviously possible that another driving unit and another control valve are adopted. The other driving unit and the other control valve may be, for example, one that uses a screw to convert a rotation of a drive shaft of a motor into a linear motion of a valve body, as well as one that transmits an operation force of a drive shaft of a motor to a valve body that rotates (e.g., ball valves and rotary valves). Even when such a driving unit and such a controller are adopted, effects similar to the effects of the embodiments can be achieved by disposing a control valve in an inclined manner, allowing the vehicle body side tube 11 to have an upper portion that is shortened in the axial direction (central axis C1 direction).

DESCRIPTION OF THE REFERENCE NUMERAL 10, 90 hydraulic shock absorber
11 vehicle body side tube
12 wheel side tube
15 cylinder
16 rod
19 piston
20 lower chamber
21 upper chamber
22 passage
23 lower end opening
24 upper end opening
25 cap member
26 reservoir
39 oil storage chamber
60 control valve
62 abutting portion (part of bottom portion)
67 inlet
72 valve seat
75 closing face
76 end face
77 valve body
82 spring
83 throttle flow channel

The invention claimed is:

1. A hydraulic shock absorber comprising:
a vehicle body side tube and a wheel side tube which are respectively disposed on a vehicle body side and a wheel side and arranged in a telescopic manner;
a cylinder provided to the wheel side tube;
a reservoir defined outside the cylinder;
a rod provided to the vehicle body side tube;
a piston provided at a lower end of the rod, the piston slidably abutting an inner circumferential surface of the cylinder, the piston separating the cylinder into an upper chamber and a lower chamber;
a passage formed inside the rod, the passage having an upper end opening that opens at an upper end of the rod and a lower end opening that opens inside the cylinder; and
a control valve provided at an upper portion of the vehicle body side tube, the control valve being configured to apply flow channel resistance to operating oil flowing from the upper end opening of the passage to the reservoir at extension and contraction operations in which the rod exits from and enters the cylinder,
wherein the control valve comprises;
a valve seat formed with a closing face,
a valve body configured to come into contact with the closing face, and
a valve shaft configured to transmit an operation force applied from a driving unit to the valve body,
wherein the control valve is defined with an upstream side flow channel extending from an inlet coupled to the upper end opening, via a space in which the valve body moves, to the closing face, and a downstream side flow channel extending from the closing face to an outlet, and
wherein the control valve is disposed above the cylinder so that a central axis of the valve shaft is inclined relative to a central axis of the vehicle body side tube and the wheel side tube.

2. The hydraulic shock absorber according to claim 1, further comprising a throttle flow channel that is in communication with the flow channel in the control valve and the upper end opening at a position that differs from a position of the inlet of the flow channel in the control valve, the inlet being connected to the upper end opening,
wherein, in the control valve, the valve seat is disposed movable together with the valve body, and is configured to cause a flow to occur in the throttle flow channel as the valve seat moves.

3. The hydraulic shock absorber according to claim 1, wherein the control valve further comprises a spring accommodated in a cap member disposed on the vehicle body side tube, the spring biasing the valve seat in a direction toward which the valve body is pushed back, and
wherein an end face lying opposite to the closing face of the valve seat and a bottom portion formed in the cap member generate flow channel resistance.

4. The hydraulic shock absorber according to claim 3, wherein the control valve is configured to generate flow channel resistance in accordance with pressure of the operating oil by a balance between a pressing force of the valve body and a reaction force of the valve seat.

5. The hydraulic shock absorber according to claim 1, further comprising an oil storage chamber disposed downstream of the control valve.

6. The hydraulic shock absorber according to claim 2, wherein the control valve further comprises a spring accommodated in a cap member disposed on the vehicle body side tube, the spring biasing the valve seat in a direction toward which the valve body is pushed back, and
wherein an end face lying opposite to the closing face of the valve seat and a bottom portion formed in the cap member generate flow channel resistance.

7. The hydraulic shock absorber according to claim 6, wherein the control valve is configured to generate flow channel resistance in accordance with pressure of the operating oil by a balance between a pressing force of the valve body and a reaction force of the valve seat.

8. The hydraulic shock absorber according to claim 2, further comprising an oil storage chamber disposed downstream of the control valve.

9. The hydraulic shock absorber according to claim 3, further comprising an oil storage chamber disposed downstream of the control valve.

10. The hydraulic shock absorber according to claim 6, further comprising an oil storage chamber disposed downstream of the control valve.

11. The hydraulic shock absorber according to claim 4, further comprising an oil storage chamber disposed downstream of the control valve.

12. The hydraulic shock absorber according to claim 7, further comprising an oil storage chamber disposed downstream of the control valve.

* * * * *